United States Patent
Szajewski et al.

(10) Patent No.: US 8,066,364 B2
(45) Date of Patent: Nov. 29, 2011

(54) INKJET INKS HAVING ANTI-ABRASION POLYMERS AND ANTI-ABRASION AIDS

(75) Inventors: Richard P. Szajewski, Rochester, NY (US); Paul J. Madigan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 438 days.

(21) Appl. No.: 12/234,747

(22) Filed: Sep. 22, 2008

(65) Prior Publication Data

US 2009/0167824 A1    Jul. 2, 2009

Related U.S. Application Data

(60) Provisional application No. 61/016,951, filed on Dec. 27, 2007.

(51) Int. Cl.
*G01D 11/00* (2006.01)

(52) U.S. Cl. ............................ 347/100; 347/95; 523/161

(58) Field of Classification Search .................. 347/100, 347/95, 96, 101; 106/31.6, 31.27, 31.13; 523/160, 161
See application file for complete search history.

(56) References Cited

U.S. PATENT DOCUMENTS

| | | | | |
|---|---|---|---|---|
| 5,976,233 | A | * 11/1999 | Osumi et al. | ............... 106/31.86 |
| 6,180,691 | B1 | 1/2001 | Cheng et al. | |
| 6,713,531 | B2 | 3/2004 | Iijima | |
| 6,866,707 | B2 | 3/2005 | Kato | |
| 2002/0156153 | A1 | 10/2002 | Tsang et al. | |
| 2005/0004263 | A1* | 1/2005 | Gould et al. | .................. 523/160 |
| 2007/0131144 | A1* | 6/2007 | Winter et al. | .............. 106/31.66 |

FOREIGN PATENT DOCUMENTS

WO    2006/052707    5/2006

* cited by examiner

*Primary Examiner* — Manish S Shah
(74) *Attorney, Agent, or Firm* — Andrew J. Anderson

(57) ABSTRACT

An aqueous inkjet ink is described including water, a charge stabilized anti-abrasion polymer provided as a hydrophobic colloidal sol, a water-soluble humectant and a polyethyleneglycol-diether compound of Formula I as an anti-abrasion aid:

$$R_1-(OCH_2CH_2)_nO-R_2 \qquad (I)$$

where $R_1$ and $R_2$ can be the same or different and are individually alkyl with 1 to 4 carbons, or phenyl, and n is between 2 and 45. Also described is a related aqueous inkjet ink-set and an image forming method having the step of imagewise applying by jetting to a receiver, one or more aqueous inks, as above described.

20 Claims, No Drawings

INKJET INKS HAVING ANTI-ABRASION POLYMERS AND ANTI-ABRASION AIDS

CROSS-REFERENCE TO RELATED APPLICATIONS

This application claims the benefit of U.S. Provisional Patent Application No. 61/016,951, filed Dec. 27, 2007.

FIELD OF THE INVENTION

This invention relates to inkjet inks and inkjet ink-sets formulated to provide abrasion resistant images on glossy receivers as well as methods of forming abrasion resistant images.

BACKGROUND OF THE INVENTION

Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation (thermal inkjet (TIJ)). In another process, known as continuous inkjet (CIJ), a continuous stream of droplets is charged and deflected in an image-wise manner onto the surface of the image-recording element, while un-imaged droplets are caught, and returned to an ink sump. Inkjet printers have found broad applications across markets ranging from desktop document and photographic-quality imaging, to short run printing and industrial labeling.

It is well known in the art that printed images generated using inkjet technology may not be very stable with regard to environmental effects of light and ozone. Another problem with such printed images is that they may be easily scratched during handling and may not be resistant to typical aqueous solutions such as coffee, fruit punch, etc. Scratches on the printed images are particularly objectionable to consumers as these defects detract from the overall image quality.

Several methods have been used to protect printed images generated using inkjet technology. One method is referred to as lamination and involves the application of a clear durable film over the printed image. Another method involves printing onto specially designed inkjet recording elements that are subsequently fused to form a clear durable film over the printing image. Both of these methods have drawbacks in that an integral or peripheral fusing station is required.

Another method for increasing the durability of printed images involves application of an overcoat composition onto the surface of the printed image using a brush, roller, sponge, etc. As the composition dries, a clear durable film is formed. This method is useful in a variety of commercial printing applications but is considered too impractical and undesirable for consumer use in the home.

To this end, the use of a colorless ink supplied in a printhead of an inkjet printer has become increasingly popular. The printhead containing the colorless ink is typically part of the same carriage assembly containing colored inks, and the printer is instructed to jet the colorless ink either simultaneously with or, after the colored inks are jetted. U.S. Pat. Nos. 6,428,157 and 6,206,586 describe an inkjet printing apparatus for applying a composition capable of forming a continuous protective overcoat film.

The colorless inks, also known as overcoat solutions or clear ink compositions, are typically formulated with polymer, water, and other components commonly used in aqueous-based inkjet ink formulations, for example, humectants, organic solvents, surfactants and biocides. U.S. Pat. Nos. 6,723,784; 6,604,819; and 6,543,888 describe a coating liquid and image recording method that provides a transparent topcoat for recordings. Jetting an aqueous suspension of fine polymer particles onto a recorded image forms the topcoat.

U.S. Pat. No. 6,561,644 describes an inkjet printing method for enhancing the durability of an image by applying a water-dispersible polyester resin over the printed image. U.S. Pat. No. 5,640,187 describes an inkjet recording method having a step in which a solution containing a resin having an acid value of 30 to 100 and soluble in alkali is discharged to a recording member prior to or after the ink is discharged.

U.S. Pat. No. 6,894,107 describes inkjet ink compositions containing fusible polymers that may be used in a colorant containing ink, or as a separate clear ink composition, which are thermally fused after printing of the colored inks. GB Patent Publication No. 2,337,482 and EP Patent Publication No. 1,186,439 describe natural and synthetic resin compositions that are used to overcoat inkjet recorded images using an inkjet printer. US Patent Publication No. 2004/0202838 describes a durability enhancing overcoat composition comprising addition polymers having an acid number from between 110 and 300. International Publication No. WO2006/052707 describes a durability enhancing overcoat composition comprising a polyurethane resin. US Patent Publication No. 2002/0156153 describes the use of polymeric additives in fixatives for inkjet printing in order to improve print quality and image permanence attributes on plain paper.

Another approach to improving the durability of a printed image is to incorporate synthetic or natural resins into the colored inks prior to ejection from the inkjet printer. Approaches that utilize high molecular weight polymeric dispersants and latexes in the pigmented ink compositions have been employed in drop-on-demand piezoelectric printhead printers directed at photographic quality pictorial image reproduction (U.S. Pat. Nos. 6,713,531; 6,180,691; and 6,866,707).

To date, these approaches have not afforded printed images with excellent durability and scratch resistance.

SUMMARY OF THE INVENTION

It is a goal of this invention to provide inkjet inks, inkjet ink-sets, and inkjet image forming methods that result in images having excellent durability and scratch resistance as well as excellent color, stability and exhibiting high image quality.

The above problems are solved by providing aqueous inkjet ink comprising water, a charge stabilized anti-abrasion polymer provided as a hydrophobic colloidal sol, a water-soluble humectant and a polyethyleneglycol-diether compound of Formula I as an anti-abrasion aid:

$$R_1-(OCH_2CH_2)_nO-R_2 \qquad (I);$$

where $R_1$ and $R_2$ can be the same or different and are individually alkyl with 1 to 4 carbons, or phenyl; and n is between 2 and 45.

The ink composition enables the formation of an anti-abrasion film on ink dry-down. The ink can be a colored ink or it can be a clear ink. When the ink is a colored ink it preferably comprises a pigment colorant. The pigment colorant can be a self-dispersed pigment, a surfactant dispersed pigment, or preferably a polymeric dispersed pigment. When the pigment is a polymeric dispersed pigment, the dispersing polymer is preferentially formed from hydrophobic and hydrophilic monomers. The preferred hydrophobic monomers are chosen from benzyl(meth)acrylate and (meth) acrylic acid esters having twelve or more carbons, and the hydrophilic monomers are chosen from carboxylate monomers.

The anti-abrasion polymer is a charge-stabilized polymer provided as a hydrophobic colloidal sol that forms an anti-abrasion film on dry-down. The polymer preferably exhibits a weight average molecular weight (Mw) between 6,000 and 60,000, a Tg of between 20 and 180°C., an acid number between 30 and 180, and is preferably present in inks at between 0.05 and 5 percent by weight. The anti-abrasion polymer is preferably an anionic charge stabilized polyurethane.

The anti-abrasion aid can be present in inks at between 0.1 and 8 percent by weight, preferably present at between 1 and 5 percent by weight, and is preferably totally water soluble at the included amount. It has a number average molecular weight (Mn) between 100 and 2500, preferably between 160 and 2000, and more preferably has Mn between 200 and 750.

The humectant can be any water-soluble humectant known in the ink-jet art or mixtures of water soluble humectants known in the art. The humectant is present at between about 3 and 45 percent by weight.

The ink comprises at least 50 percent by weight water.

The ink is at a pH enabling charge stabilization of the polymer lyophobic sol.

The benefits of the invention are further realized by providing an aqueous inkjet ink-set having at least two distinctly formulated inks wherein at least one of said inks comprises an anti-abrasion polymer, at least one of the inks, which can be the same or different, comprises an anti-abrasion aid and at least one of said inks, which can be the same or different, comprises a pigment colorant. The ink set can have a colored pigmented inkjet ink and an uncolored protective inkjet ink. The inkjet ink-set can preferably have cyan, magenta, yellow, and black inks.

The benefits of the invention are additionally realized by providing an image forming method having the step of imagewise applying by jetting to a receiver, one or more aqueous inks, said inks cumulatively comprising water, an anti-abrasion polymer, at least one humectant and an anti-abrasion aid. The imagewise applying step provides for the local admixture of the anti-abrasion polymer and anti-abrasion aid at common spatial loci on the receiver. The method can provide for employing both a colored pigmented inkjet ink and an uncolored protective inkjet ink. The method can further provide for employing cyan, magenta, yellow, and black inks. The receiver is preferably a glossy receiver.

DETAILED DESCRIPTION OF THE INVENTION

The ink compositions known in the art of inkjet printing may be aqueous- or solvent-based, and in a liquid, solid or gel state at room temperature and pressure. Aqueous-based ink compositions are preferred because they are more environmentally friendly as compared to solvent-based inks, plus most printheads are designed for use with aqueous-based inks. The inks of the invention are aqueous inks. "Aqueous inks" is defined herein to mean the ink composition comprises at least 50% and preferably at least 70% by weight water.

The anti-abrasion polymers useful in the invention form a charge stabilized hydrophobic colloidal sol in the aqueous inks of the invention and enable anti-abrasion film formation on ink dry-down. Most generally, a lyophobic colloidal sol comprises individual polymer chains that form loose associations of polymer that, when destabilized, can steadily and irreversibly further aggregate according to a second-order rate law with time. When these lyophobic sols form in an aqueous environment they are called hydrophobic sols. The polymers useful in the invention are stabilized against aggregation by charge stabilization. For polymers stabilized by acid groups, the extent of polymer charge stabilization is quantified as the polymer acid number (AN). A calculated polymer acid number is defined as the number of moles of acid monomer per gram of monomer in the polymer forming feedstock times 56 (which is the molecular weight of potassium hydroxide). A measured acid number is the number of moles of acid found per gram of polymer times 56 when titrating with potassium hydroxide in water. Conversely, for polymers stabilized by base groups, the extent of polymer charge stabilization is quantified as the polymer base number (BN). A calculated polymer base number is defined as the number of moles of base monomer per gram of monomer in the polymer forming feedstock times 63 (which is the molecular weight of nitric acid). A measured base number is the number of moles of base found per gram of polymer times 63 when titrating with nitric acid in water. In this specification and in the claims, the term "charge stabilization number" (CN) will be used generically to describe the extent of polymer charge stabilization irrespective of the charge character (acidic or basic) of the charge stabilizing group. These hydrophobic sols are distinct from generic lyophilic colloidal sols, known specifically as hydrophilic sols in the case of water based systems, in that the hydrophilic sols form true solutions of polymer in water and can be reconstituted on rewetting after dry down. These hydrophobic sols are additionally distinct from the so-called associative sols, i.e. micelle forming mixtures of water-soluble polymers in water in that the associative sols can be reconstituted on rewetting after dry down. These hydrophobic colloidal polymer sols are further distinct from water dispersible polymeric particles in that the latter comprise discrete particles. In some cases these water dispersible polymeric particles can aggregate or flocculate when destabilized, but they do so as particles that can be redispersed. In other cases the water dispersible polymeric particles can aggregate irreversibly so as to form a continuous phase when their Tg is below the dry-down temperature.

Any polymeric material forming a charge stabilized hydrophobic colloidal sol in the described aqueous ink and further enabling anti-abrasion film formation on dry-down is useful in the practice of the invention. While charge stabilized hydrophobic sol forming polymers of any Mn that enables practice of the invention can be employed, the hydrophobic sole forming polymers most useful in the invention exhibit a weight average molecular weight (Mw) between 6,000 and 60,000, more preferably an Mw between 9,000 and 40,000, and most preferably an Mw between 10,000 and 30,000. While any charge stabilized hydrophobic sol forming polymer that enables practice of the invention can be employed, the hydrophobic sol forming polymers useful in the invention exhibit charge number (CN) between 30 and 180, preferably between 50 and 120, more preferably between 60 and 100, and most preferably between 70 and 90. The incorporated acid groups provide for charge stabilization in appropriate pH regimes, with acid groups providing stabilization at ink pH values where the acid groups are ionized, typically in the higher pH inks and base groups providing stabilization at ink pH values where the base groups are ionized, typically in the lower pH inks. The polymer forming the hydrophobic colloidal sol typically exhibits a Tg of between 20 and 180° C., preferably a Tg of between 40 and 120° C., and more preferably a Tg of between 60 and 100° C. The charge stabilized hydrophobic sol forming polymer is preferably present in inks at between 0.05 and 5 percent by weight, and more preferably present at between 0.2 and 3 percent by weight. Mixtures of distinct charge stabilized hydrophobic sol forming polymers are specifically contemplated.

Particularly useful charge stabilized hydrophobic sol forming polymers useful in the inkjet inks of the invention are the charge stabilized hydrophobic sol forming polyurethanes. Water-dispersible polyurethanes are disclosed as binders in pigmented inks in U.S. Pat. No. 6,533,408, and particularly useful polyurethanes for pigmented inkjet inks which exhibit good jetting performance and good resulting image durability are described in US Patent Publication No. 2004/0085419, of which the disclosures of both are incorporated herein by reference. Particularly useful anionic charge stabilized hydrophobic sol forming polyurethanes exhibit an acid number of 60 to 100, and preferably between 70 to 90.

The invention preferably employs a polyurethane formed from at least one monomer comprising at least two hydroxyl groups and another monomer comprising at least two isocyanate groups. The acid number of the polyurethane is provided by acid groups that are, in turn, provided by the at least one monomer comprising at least two hydroxyl groups. The acid groups are preferably carboxylic acid groups, but any type of acid groups can be used. Examples of monomers comprising at least two hydroxyl groups and at least one carboxylic acid group are 2,2-bis(hydroxymethyl)propionic acid and the hydroxyethylether of 4,4-bis(4-hydroxyphenyl)-valeric acid. Other examples are described in U.S. Pat. No. 6,268,101 and US Publication No. 2003/0184629, and references cited therein.

The polyurethanes are also preferably derived from a monomer having at least two isocyanate groups; diisocyanates are typically used in the art of polyurethane chemistry, but triisocyanates can also be used. Examples of diisocyanates include isophorone diisocyanate and others described in the above references.

The polyurethanes used in the invention are optionally derived from an additional monomer comprising at least two hydroxyl groups and which is different from the monomer having at least two hydroxyl groups and at least one carboxyl group. These optional monomers can be higher molecular weight monomers having a molecular weight of more than about 300, and typically less than 3000. They are often referred to in the art as polyols and examples include those described in the above references. Examples also include polyols and polyhydroxy derivatives of polycarbonates, polyethers, polyesters, polyacetals, polyacrylates, polyester amides, and polythioethers. Preferably the optional monomer is a polycarbonate. More preferably, the optional monomer comprising at least two hydroxyl groups is a poly(hexamethylene carbonate)diol.

The polyurethane used in the invention preferably has a weight average molecular weight, Mw, of greater than 10,000. If Mw is less than 10,000, then the inkjet ink composition may not provide adequate stain and scratch resistance. The maximum Mw of the polyurethane is not particularly limited, but is generally dictated by the physical property requirements of the composition and the method by which it will be applied, as discussed below. If the ink composition is used as an inkjet ink for a thermal printhead, then the preferred maximum Mw of the polyurethane is 30,000. The polyurethane is preferably present at between 0.1 and 3 percent by weight.

The anti-abrasion aid employed in the invention comprises a polyethyleneglycol-diether according to Formula I.

$$R_1-(OCH_2CH_2)_nO-R_2 \qquad (I);$$

where $R_1$ and $R_2$ can be the same or different and are individually alkyl with 1 to 4 carbons, or phenyl; and n is between 2 and 45. In a preferred embodiment one or both of $R_1$ and $R_2$ are methyl.

The anti-abrasion aid can be present in inks at between 0.1 and 8 percent by weight, and preferably present at between 1 and 5 percent by weight and is water soluble at the included amount. It has a number average molecular weight (Mn) between 160 and 2000, and preferably has Mn between 200 and 750. The anti-abrasion aid is chemically non-reactive in the ink formula. Preferred anti-abrasion aids include polyethylene glycol dimethyl ether oligimers.

Ink compositions useful in the invention include one or more water-soluble humectants, also called co-solvents, in addition to the anti-abrasion polymers and anti-abrasion aids described herein, in order to provide further useful properties to the inkjet ink. Typical useful properties include but are not limited to: preventing the ink composition from drying out or crusting in the nozzles of the printhead, aiding solubility of the components in the ink composition, aiding firing properties of the ink form an ejector, facilitating penetration of the ink composition into the image-recording element after printing, aiding gloss, suppressing intercolor bleed, suppressing coalescence, and suppressing mechanical artifacts such as paper cockle and curl during and after printing. Any water-soluble humectant known in the ink-jet art can be employed. "Water-soluble" is defined herein to mean a mixture of the employed humectant(s) and water is homogeneous. While an individual humectant can be employed, useful inkjet inks can employ mixtures of two, three, or more humectants, each of which imparts a useful property to the inkjet ink. Representative examples of humectants and co-solvents used in aqueous-based ink compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, dipropyleneglycol, the polyethylene glycols, the polypropylene glycols, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,2-pentanediol, 1,5-pentanediol, 1,2-hexanediol, 1,6-hexanediol, 2-methyl-2,4-pentanediol, 1,7-hepanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols, and thioglycol; (3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives; (4) nitrogen-containing compounds such as urea, 2-pyrrolidone, N-methyl-2-pyrrolidone, imidazolidinone, N-hydroxyethyl acetamide, N-hydroxyethyl 2-pyrrolidinone, 1-(hydroxyethyl)-1,3-imidazolidinone and 1,3-dimethyl-2-imidazolidinone; and (5) sulfur-containing compounds such as 2,2'-thiodiethanol, dimethyl sulfoxide, and tetramethylene sulfone. While any quantity of water soluble humectants, singly or in combination of two or more, that enables practice of the invention can be employed, the total quantity of water soluble humectant is typically at between 3 and 45 percent by weight and preferably at between 6 and 35 percent by weight. Typical aqueous-based ink compositions useful in the invention can contain, for example, the following components based on the total weight of the ink: water 50-95%, and humectant(s) 3-45%.

The pH of the aqueous ink compositions of the invention can be adjusted by the addition of organic or inorganic acids or bases. Useful inks can have a preferred pH of from about 2 to 10, depending upon the type of dye or pigment being used and depending on the charge characteristics of the anti-abrasion charge stabilized hydrophobic sol forming anti-abrasion polymer employed. Cationic charge stabilized anti-abrasion polymers are employed in inks having a pH of less than about 7, with a preferred pH range of about 2.5 to 6.5, and more preferred pH range of about 3.5 to 6. Anionic charge stabilized anti-abrasion polymers are employed in inks having a pH of above about 7, with preferred pH ranges of between 7 and 11, and a more preferred pH range of between 7.5 and 10. Cationic charged pigments can be employed in combination with cationic charge stabilized anti-abrasion polymers while anionic charged pigments can be employed in combination with anionic charge stabilized anti-abrasion polymers. Typical inorganic acids include nitric, hydrochloric, phosphoric, and sulfuric acids. Typical organic acids include methanesulfonic, acetic, formic, and lactic acids. Typical inorganic bases include alkali metal hydroxides and carbonates. Typical organic bases include ammonia, triethanolamine, and tetramethylethlenediamine. The well known Goods buffers can also be employed.

The ink composition can be colored with pigments, dyes, polymeric dyes, loaded-dye/latex particles, or any other types of colorants, or combinations thereof. Pigment-based ink compositions are used because such inks render printed images having higher optical densities and better resistance to light and ozone as compared to printed images made from other types of colorants. The ink composition can be yellow, magenta, cyan, black, gray, red, violet, blue, green, orange, brown, etc. Pigment colored inks are preferred in this invention.

A wide variety of organic and inorganic pigments, alone or in combination with additional pigments or dyes can be used in the ink composition of the present invention. Pigments that can be used in the invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that can be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194;C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic, or non-ionic groups such that a separate dispersant is not necessary. The preparation and use of covalently functionalized self-dispersed pigments suitable for inkjet printing are reported in U.S. Pat. Nos. 6,758,891; 6,660,075; 5,554,739; 5,707,432; 5,803,959; 5,922,118; 5,837,045; 6,494,943; 6,280,513; 6,506,239; 6,503,311; 6,852,156; 6,488,753; EP Patent Publication No. 1,479,732; and International Patent Publication Numbers WO1996/18695, WO1996/18696, WO1996/18689, WO1999/51690, WO2000/05313, and WO2001/51566. Examples of commercially available self-dispersing type pigments include CAB-O-JET-200®, CAB-O-JET-250®, CAB-O-JET-260®, CAB-O-JET-270®, and CAB-O-JET-300® (Cabot Specialty Chemicals, Inc.) and BONJET CW-1® and CW-2® (Orient Chemical Industries, Ltd.).

Pigment-based ink compositions employing non-self-dispersed pigments that are useful in the invention can be prepared by any method known in the art of inkjet printing. Useful methods commonly involve two steps: (a) a dispersing or milling step to break up the pigments to primary particles, where primary particle is defined as the smallest identifiable subdivision in a particulate system; and (b) a dilution step in which the pigment dispersion from step (a) is diluted with the remaining ink components to give a working strength ink.

The milling step (a) is carried out using any type of grinding mill such as a media mill, ball mill, two-roll mill, three-roll mill, bead mill, and air-jet mill; an attritor; or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals, and plastics as described, for example, in U.S. Pat. No. 5,891,231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. Nos. 5,679,138; 5,651,813; or 5,985,017.

Polymeric dispersants are also known and useful in aqueous pigment-based ink compositions. Polymeric dispersants can be added to the pigment dispersion prior to, or during the milling step (a), and include polymers such as homopolymers and copolymers; anionic, cationic, or nonionic polymers; or random, block, branched, or graft polymers. Polymeric dispersants useful in the milling operation include random and block copolymers having hydrophilic and hydrophobic portions (see for example U.S. Pat. Nos. 4,597,794; 5,085,698; 5,519,085; 5,272,201; 5,172,133; 6,043,297, and WO 2004/111140) and graft copolymers (see for example U.S. Pat. Nos. 5,231,131; 6,087,416; 5,719,204; or 5,714,538).

Typically, these polymeric resins are copolymers made from hydrophobic and hydrophilic monomers. In this case, the copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. The pigment dispersions useful in pigment-based ink composition desirably have a median particle diameter of less than 200 nm and more preferably less than 100 nm.

The polymeric dispersant (copolymer) for the pigment is not limited in the arrangement of the monomers comprising the copolymer. The arrangement of monomers can be totally random, or they can be arranged in blocks such as AB or ABA wherein, A is the hydrophobic monomer and B is the hydrophilic monomer. In addition, the polymer make take the form of a random terpolymer or an ABC tri-block wherein, at least one of the A, B, and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains can be linear or branched. Examples of methacrylic and acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer can be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid.

Typically, the weight average molecular weight of the copolymer dispersant has an upper limit such that it is less than about 50,000 Daltons. Desirably the weight average molecular weight of the copolymer is less than about 25,00 Daltons; more preferably it is less than 15,000 and most preferably less than 10,000 Daltons. The molecular weight of the copolymer of the present invention has a weight average molecular weight lower limit such that it is greater than about 500 Daltons.

In one preferred embodiment the copolymer dispersants are those wherein the hydrophobic monomer is benzyl methacrylate and is present from 50 weight percent to 80 weight percent relative to the total weight of the polymeric dispersant and the hydrophilic monomer is methacrylic acid.

In a second preferred embodiment the copolymer dispersants comprise a hydrophobic monomer having a carbon chain length of greater than or equal to 12 carbons present in an amount of at least 10% by weight of the total copolymer, and more preferably greater than 20% by weight, an optional additional hydrophobic monomer comprising an aromatic group and the hydrophilic monomer is methacrylic acid. For example, the additional aromatic group containing monomer can be benzyl acrylate or benzyl methacrylate. A preferred additional monomer is benzyl methacrylate.

The total amount of hydrophobic monomers, comprising the monomer having a chain with greater than or equal to 12 carbons and optionally, a monomer containing an aromatic group, are present in the polymer in an amount of 20 to 95% by weight of the total polymer. The hydrophobic aromatic-group containing monomer can be present in an amount from about 0 to 85% by weight of the total polymer, more preferably from about 0 to 60%, and most preferably from about 0 to 50%. A particularly preferred embodiment is a terpolymer of benzyl methacrylate, stearyl methacrylate, and methacrylic acid.

Particularly useful polymeric pigment dispersants are further described in US Publication Numbers 2006/0012654 and 2007/0043144, the disclosures of which are incorporated herein by reference.

Encapsulating-type polymeric dispersants and polymeric dispersed pigments thereof can also be used in the invention. Specific examples are described in U.S. Pat. Nos. 6,723,785 and 6,852,777; and US Publication Numbers 2004/0132942, 2005/0020731, 2005/0009951, 2005/0075416, 2005/0124726, 2004/0077749, and 2005/0124728; the disclosures of which are incorporated by reference. Encapsulating-type polymeric dispersants can be especially useful because of their high dispersion stability upon keeping and the low degree of interaction with ink components. Composite colorant particles having a colorant phase and a polymer phase are also useful in aqueous pigment-based inks of the invention. Composite colorant particles are formed by polymerizing monomers in the presence of pigments, see for example US Publication Numbers 2003/0199614, 2003/0203988, or 2004/0127639. Microencapsulated-type pigment particles are also useful and consist of pigment particles coated with a resin film, see for example U.S. Pat. No. 6,074,467.

Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes, and the like. Specific examples of dyes usable in the present invention are as follows; yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including; C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as JPD Magenta EK-1 Liquid from Nippon Kayaku Kabushiki Kaisha; CAS No. 153204-88-7 sold as INTRA-JET® Magenta KRP from Crompton and Knowles Colors; the metal azo dyes disclosed in U.S. Pat. Nos. 5,997,622 and 6,001,161.

Also useful in the invention are polymeric dyes or loaded-dye/latex particles. Examples of polymeric dyes are described in U.S. Pat. No. 6,457,822 and references therein. Examples of loaded-dye/latex particles are described in U.S. Pat. No. 6,431,700 and US Publication Numbers 2004/0186199, 2004/0186198, 2004/0068029, 2003/0119984, and US 2003/0119938.

The colorants used in the ink composition of the invention can be present in any effective amount, generally from 0.1 to 10% by weight, and preferably from 0.5 to 6% by weight.

Inkjet ink compositions can also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 describes the use of a water-dispersible polymeric in dye-based inks in order to improve light and ozone resistance of the printed images. For use of such particles to improve gloss differential, light and/or ozone resistance, waterfastness, rub resistance, and various other properties of a printed image, see for example U.S. Pat. No. 6,598,967. Colorless ink compositions that contain non-colored particles and no colorant can also be used. Colorless ink compositions are often used in the art as "fixers" or insolubilizing fluids that are printed under, over, or with colored ink compositions in order to reduce bleed between colors and waterfastness on plain paper, see for example U.S. Pat. Nos. 5,866,638 or 6,450,632. Colorless inks are also used to provide an overcoat to a printed image, usually in order to improve scratch resistance and waterfastness, see for example, US Publication No.2002/0009547 or EP Patent Publication No. 1,022,151 A1. Colorless inks are also used to reduce gloss differential in a printed image, see for example U.S. Pat. No. 6,604,819 or US Publication Numbers 2003/0085974, 2003/0193553, or 2003/0189626.

Examples of inorganic particles useful in the invention include, but are not limited to, alumina, boehmite, clay, calcium carbonate, titanium dioxide, calcined clay, aluminosilicates, silica, or barium sulfate.

In addition to the charge stabilized hydrophobic sol polymers described above, additional polymers can be present in the inkjet inks of the invention. These additional polymeric materials useful in the aqueous-based inks of the invention can be classified as water-soluble polymers, water-reducible polymers, or water-dispersible polymeric particles.

"Water-soluble" is defined herein to mean the polymer is dissolved in water such that scattering is not observed when a dilute solution of the polymer is analyzed using dynamic light scattering or any other technique well known in the art of particle analysis. These are the same as the hydrophilic polymers distinguished over above.

"Water-reducible" is defined herein to mean the polymer can be diluted with water to form reasonably stable dispersions of polymer aggregates swollen by solvent and water, as described in "Organic Coatings: Science and Technology" (2nd Edition by Wicks, Jones, and Papas, published by Wiley-Interscience, 1999). Such polymers have hydrophilic groups in some monomers, but are not water soluble until neutralized by base. When solubilized, these are like the associated sol forming polymers distinguished over above.

"Water-dispersible" is defined herein to mean the polymer exists in the form of discrete particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis. These are the same as the water dispersible polymers distinguished over above.

The water-soluble polymers useful in the ink compositions include nonionic, anionic, amphoteric, and cationic polymers. Representative examples of water soluble polymers include, polyvinyl alcohols, polyvinyl acetates, polyvinyl pyrrolidones, carboxymethyl cellulose, polyethyloxazolines, polyethyleneimines, polyamides and alkali soluble resins, polyurethanes (such as those found in U.S. Pat. No. 6,268,101), polyacrylic acids, styrene-acrylic methacrylic acid copolymers (such as JONCRYL® 70 from S.C. Johnson Co., TRUDOT® IJ-4655 from MeadWestvaco Corp., and VAN-CRYL® 68S from Air Products and Chemicals, Inc.), and polymers exemplified in U.S. Pat. No. 6,866,379 and U.S. Publication No. 2005/0134665.

The water-dispersible polymer particles are generally classified as either addition polymers or condensation polymers, both of which are well known to those skilled in the art of polymer chemistry. Examples of water-dispersible polymer particle classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film forming, non-film-forming, fusible, or heavily cross-linked, and can have a wide range of molecular weights and glass transition temperatures.

Examples of water dispersible polymeric particles used in inkjet inks are styrene-acrylic copolymers sold under the trade names JONCRYL® (S.C. Johnson Co.), UCAR™ (Dow Chemical Co.), JONREZ® (MeadWestvaco Corp.), and VANCRYL® (Air Products and Chemicals, Inc.); sulfonated polyesters sold under the trade name EASTMAN AQ® (Eastman Chemical Co.); and polyethylene or polypropylene resin emulsions and polyurethanes (such as the WITCOBONDS® from Witco Corp.). Core-shell polymer particles have also been employed inkjet inks for water-fastness and rub-resistance improvements (U.S. Pat. Nos. 5,814,685; 5,912,280; 6,057,384; 6,271,285; 6,858,301). Additional examples of water disperseable polymer particles include the thermoplastic resin particles as disclosed in U.S. Pat. Nos. 6,147,139 and 6,508,548. The polymer particles can be a mixture of high and low glass transition temperature polymers such as those disclosed in U.S. Pat. No. 6,498,202. Additionally, core-shell polymer particles as described in U.S. Pat. Nos. 5,814,685; 5,912,280; 6,057,384; 6,271,285; and 6,858,301 can be employed. It is also possible to include in the ink, in addition to the durability enhancing polymer particles, heavily cross-linked polymer particles.

The non-colored particles used in the ink compositions can be present in any effective amount, generally from 0.01 to 20% by weight, and preferably from 0.01 to 6% by weight. The exact choice of non-colored particles will depend upon the specific application and performance requirements of the printed image.

Surfactants can be added to adjust the surface tension of the ink to an appropriate level. The surfactants can be anionic, cationic, amphoteric or nonionic, and used at levels of 0.01 to 5% of the ink composition. Examples of suitable nonionic surfactants include linear or secondary alcohol ethoxylates (such as the TERGITOL® 15-S and TERGITOL® TMN series available from Union Carbide and the BRIJ® series from Uniquema), ethoxylated alkyl phenols (such as the TRITON® series from Union Carbide), fluoro surfactants (such as the ZONYLS® from DuPont and the FLUORADS® from 3M), fatty acid ethoxylates, fatty amide ethoxylates, ethoxylated and propoxylated block copolymers (such as the PLURONIC® and TETRONIC® series from BASF), ethoxylated and propoxylated silicone based surfactants (such as the SILWET® series from CK Witco), alkyl polyglycosides (such as the GLUCOPONS® from Cognis), and acetylenic polyethylene oxide surfactants (such as the Surfynols from Air Products and Chemicals, Inc.). Additionally, any conformationally asymmetric water-soluble polyoxygenated hydrocarbons enabling surface tension reduction can be employed as a surfactant. Dynamic surface tension reducing agents as known in the art can also be employed. Examples include the lower mono-alkyl ethers derived from the polyhydric alcohols; specific examples include, but are not limited to, ethylene glycol monomethyl ether, ethylene glycol monobutyl ether, ethylene glycol monoethyl ether acetate, diethylene glycol monomethyl ether, and diethylene glycol monobutyl ether acetate, (supplied as the DOWANOL®, CELLUSOLVE® and CARBITOL® series from Dow Chemical). Additional examples include the lower asymmetric alcohols. Specific examples include, but are not limited to, 1,2-butane diol, 1,2-pentane diol, 1,2-hexanediol, 1-phenyl-1,2-ethanediol, 1,2-heptane diol, 1,2-octane diol, and 1,3 hexanediol.

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX® series from Dexter Chemical), phosphonated and amine oxide surfactants, and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents" 1995, North American Editor.

A biocide can be added to an inkjet ink composition to suppress the growth of microorganisms such as molds, fungi, etc. in aqueous inks. A preferred biocide for an ink composition is PROXEL® GXL (Zeneca Specialties Co.) at a final concentration of 0.0001-0.5 wt. % or Kordek. Additional additives which can optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP, and more preferably in the range of 1.5 to 4 cP. Acceptable static surface tensions are no greater than 60 dynes/cm, and preferably in the range of 28 dynes/cm to 45 dynes/cm.

The inks of the invention can be used alone, as in a monochrome inkjet printer or in forming a monochrome inkjet image, or they can be used in combination. When the inks are used alone, the individual inks include both the anti-abrasion polymer and the anti-abrasion aid. When the inks of the invention are used in combination, they form an inkjet ink-set. The inkjet ink-set can be a monochrome inkset, so that distinct inks having distinct formulations are applied to an inkjet receiver such that the distinct inks are co-applied to a common area allowing the distinct ink formulations to merge at the receiver. An example of a monochrome inkjet ink-set would be a black colored ink and a clear ink, where the clear ink acts as a protective overcoat and binder ink for the black colorant. Alternatively, the inkjet ink set can be a color inkset. A color inkset preferably has at least cyan, magenta, and yellow colored inks with optional additions of black ink(s), such as PhotoBlack inks and text black inks, clear inks to act as gloss aids and protective overcoats, and optional red, green, blue, orange violet, photo cyan, and photo magenta inks, to aid in pictorial reproduction, all as known in the inkjet art. The inkjet inkset according to the invention comprise the anti-abrasion polymer and the anti-abrasion aid in the same ink or in different inks. When the anti-abrasion polymer and the anti-abrasion aid are present in distinct inks, the inks are co-applied with the application regions arranged to mix or merge at the receiver, thereby forming a useful anti-abrasion mixture in situ. As an example, in an inkjet inkset, all the inks can contain both the anti-abrasion polymer and the anti-abrasion aid along with colorants as desired. As another example, in an inkjet ink-set, the colored inks can contain colorant and anti-abrasion aid, with the anti-abrasion polymer applied in a merging or mixing mode from a distinct colorless protective ink. As yet another example, in an inkjet ink-set, the colored inks can contain colorant and anti-abrasion polymer, with the anti-abrasion aid applied in a merging or mixing mode from a distinct colorless protective ink. As yet a further example, in an inkjet ink-set, the colored inks can contain colorant, with the anti-abrasion polymer and the anti-abrasion aid, applied in a merging or mixing mode from a distinct colorless protective ink. In other embodiments, distinct inks can contain distinct combinations of the anti-abrasion polymer, anti-abrasion aid and pigmented colorant.

The inks of the present invention can be printed using an inkjet printhead. Any of the known printhead designs in the art of inkjet printing can be used. Preferably, the inkjet printer is equipped with a thermal inkjet printhead. Particularly preferred printhead designs are disclosed in US Patent Publication Numbers 2006/0103691 and 2008/0136867, the disclosures of which are incorporated by reference herein.

The inkjet inks, inkjet ink-sets, and image forming methods described above can be usefully employed with any suitable inkjet image receiver known in the art. This includes, but is not limit to, both matte and glossy forms of plain papers, cardstocks, cardboards, transparent or opaque plastics and vinyls, treated papers, coated papers, and multilayer image receivers. The glossy receivers are especially preferred as imaging media for use with the inventive inkjet inks, inkjet ink-sets, and inkjet image forming methods. Photo glossy and plain paper receivers are distinguished from one another in that the photo glossy receiver is manufactured with a coated layer above the underlying paper support. Examples of plain papers include Kodak bright white inkjet paper, Hewlett Packard Color inkjet paper, Xerox Extra Bright white inkjet paper, Georgia-Pacific inkjet Paper Catalog Number 999013, Staples inkjet paper, International Paper Great White MultiUse 20 Paper, Xerox Premium Multipurpose Paper, Hammermill Copy plus or ForeMP paper, and Hewlett Packard Multipurpose paper. The plain papers can include papers that have been treated with multivalent salts during or after manufacture of the paper.

Inks of the present invention can be printed as digital images having photographic quality if a suitable recording medium, such as glossy inkjet paper, is used. Photo glossy receivers can be further categorized as being a swellable media (having a non-porous polymer coating) or a microporous media, although hybrid designs are also well known. The microporous media are typically comprised of water-absorbing fine particles or powders mixed with a polymeric hydrophilic binder to form a microporous structured coating. The hydrophilic particles or powders are typically polycrystalline inorganic materials such as boehmite alumina, porous and non-porous silica (for example Sylojet or Ludox particles), or amorphous inorganic materials such as aluminum silicates. Microporous photo glossy media are preferred due to their relatively quick drying capabilities and improved water-fastness and smudge resistance compared to swellable media. The design of both the plain paper and photo glossy media vary widely depending on materials and paper manufacturing processes and should not be construed to limit the scope of the present invention.

The following examples illustrate, but do not limit, the utility of the present invention.

EXAMPLES

Example 1

Colored inks were prepared according to the following formulas (percents are weight percents). All components employed, except for the pigments, were water soluble or self-dispersing at the quantities used. The polyurethane employed comprised an anionic charge-stabilized hydrophobic sol having an acid number of 75 and a weight average molecular weight of 20,000 daltons. The polyurethane was prepared from isophorone diisocyanate, a polycarbonate diol, and 2,2-bis(hydroxymethyl)propionic acid.

Magenta Ink 1 comprised: 3% PR122 dispersed using potassium oleylmethyltaurate (KOMT) (similarly as described in U.S. Pat. Nos. 5,679,138; 5,651,813; or 5,985,017), 8% ethylene glycol, 8% glycerol, 0.5% Surfynol-465, and 0.02% Kordek with the balance as water.

Magenta Ink 2 was prepared the same as Magenta Ink 1 except for the addition of 4% polyethylene glycol dimethyl ether (PEGDME) Mn ~500 oligimer.

Magenta Ink 3 was prepared the same as Magenta Ink 1 except for the addition of 4% polyethylene glycol dimethyl ether Mn ~500 oliginer and 1.2% by weight commercial TRUDOT® IJ-4655 polystyrene-acrylic (AN ~230, Mn~13,000).

Magenta Ink 4 was prepared the same as Magenta Ink 1 except for the addition of 4% polyethylene glycol dimethyl ether Mn ~500 oligimer and 1.2% by weight polyurethane (AN~75, Mn~20,000).

Magenta Ink 5 was prepared the same as Magenta Ink 1 except for the addition of 4% polyethylene glycol dimethyl ether Mn ~500 oligimer and 1.2% by weight of a polyurethanediol having a wt. average molecular weight of 320.

Magenta Ink 6 was prepared the same as Magenta Ink 1 except for the addition of 4% polyethylene glycol dimethyl ether Mn ~500 oligimer and 1.2% by weight polyacrylamide.

Magenta Ink 7 was prepared the same as Magenta Ink 1 except for the addition of 4% polyethylene glycol dimethyl ether Mn ~500 oligimer and 1.2% by weight polyvinyl alcohol.

Magenta Ink 8 was prepared the same as Magenta Ink 1 except for the addition of 4% polyethylene glycol dimethyl ether Mn ~500 oligimer and 1.2% by weight polyvinylpyrrolidinone.

Magenta Ink 9 was prepared the same as Magenta Ink 1 except for the addition of 4% polyethylene glycol dimethyl ether Mn ~250 oligimer and 1.2% by weight polyurethane.

Magenta Ink 10 was prepared the same as Magenta Ink 1 except for the addition of 2% polyethylene glycol dimethyl ether Mn ~500 oligimer and 1.2% by weight polyurethane.

Magenta Ink 11 was prepared the same as Magenta Ink 1 except for the addition of 6% polyethylene glycol dimethyl ether Mn ~500 oligimer and 1.2% by weight polyurethane.

Magenta Ink 12 was prepared the same as Magenta Ink 1 except for the addition of 8% polyethylene glycol dimethyl ether Mn ~500 oligimer and 1.2% by weight polyurethane.

Magenta Ink 13 was prepared the same as Magenta Ink 1 except for the addition of 4% polyethylene glycol dimethyl ether Mn ~1,000 oligimer and 1.2% by weight polyurethane.

Magenta Ink 14 was prepared the same as Magenta Ink 1 except for the addition of 4% polyethylene glycol dimethyl ether Mn ~2,000 oligimer and 1.2% by weight polyurethane.

Magenta Ink 15 was prepared the same as Magenta Ink 1 except for the addition of 4% polyethylene glycol diglycidylether oligimer Mn~520 and 1.2% by weight polyurethane.

Magenta Ink 16 was prepared the same as Magenta Ink 1 except for the addition of 4% polyethylene glycol dimethylacrylate oligimer Mn~330 and 1.2% by weight polyurethane.

Magenta Ink 17 was prepared the same as Magenta Ink 1 except for the addition of 4% polyethylene glycol monomethyl ether Mn~350 and 1.2% by weight polyurethane.

Magenta Ink 18 was prepared the same as Magenta Ink 1 except for the addition of 4% polyethylene glycol monomethyl ether Mn~550 and 1.2% by weight polyurethane.

Magenta Ink 19 was prepared the same as Magenta Ink 1 except for the addition of 1.2% by weight polyurethane.

Cyan Ink 1 comprised: 2.2% PR15:3 (surfactant dispersed-KOMT), 5.4% ethylene glycol, 7.5% glycerol, 0.75% Surfynol-465, 1.3% TRUDOT® IJ4655, and 0.02% Kordek with the balance as water.

Yellow Ink 1 comprised: 2.75% PY155 (surfactant dispersed-KOMT), 5% ethylene glycol, 10% glycerol, 0.5% Strodex PK-90, 1.3% IJ4655, 0.13% triethanolamine, and 0.02% Kordek with the balance as water.

PhotoBlack Ink 1 comprised: 1.6% PK7 (surfactant dispersed-KOMT), 0.5% PR122 (surfactant dispersed-KOMT), 0.4% PB15:3 (surfactant dispersed-KOMT), 3% ethylene glycol, 9% glycerol, 0.5% Strodex PK-90, 1.3% IJ4655, 0.1% triethanolamine, and 0.02% Kordek with the balance as water.

Text Black Ink 1 comprised: 4% self-dispersed carbon black, 7% diethylene glycol, 12% glycerol, 1.4% PEG400, 0.15% Surfynol-465, and 0.02% Kordek with the balance as water.

Ink-sets #1 through 19 were assembled from Cyan Ink 1, Yellow Ink 1, Black Ink 1, and Magenta inks 1 through 19, respectively. These nineteen ink-sets were sequentially loaded into a Canon i960 thermal ink-jet printer and used to print multiple samples of a 64-patch color test chart designed to span the gamut of colors available from the individual ink-sets on Kodak Premium Picture Glossy Paper. One set of printed images were abraded using a 150 gram blunt point at 10 minutes after printing and another set of printed images were abraded using the same 150 gram blunt point at 24 hours after printing. The number of scratch marks visible on the charts after 10 minutes keep (fresh scratch) and 24 hours keep (aged scratch) were counted and the samples graded A (excellent), B (very good), C (adequate), or D (unacceptable) based on the number of scratch marks observed. Results are reported in Table I below,

TABLE I

| Ink-set # | Polymers | Potential Anti-Abrasion Aid | 10 minute scratch | 24 hour scratch | |
|---|---|---|---|---|---|
| 1 | None | None | D | C | Comparative |
| 2 | None | 4% PEGDME Mn ~500 | D | D | Comparative |
| 3 | TRUDOT® IJ-4655 | 4% PEGDME Mn ~500 | D | A | Comparative |
| 4 | Polyurethane | 4% PEGDME Mn ~500 | B | A | Inventive |
| 5 | Polyurethanediol | 4% PEGDME Mn ~500 | D | D | Comparative |
| 6 | Polyacrylamide | 4% PEGDME Mn ~500 | D | D | Comparative |
| 7 | Polyvinyl Alcohol | 4% PEGDME Mn ~500 | D | D | Comparative |
| 8 | Polyvinyl Pyrrolidinone | 4% PEGDME Mn ~500 | * | * | Comparative |
| 9 | Polyurethane | 4% PEGDME Mn ~250 | B | A | Inventive |
| 10 | Polyurethane | 2% PEGDME Mn ~500 | B | A | Inventive |
| 11 | Polyurethane | 6% PEGDME Mn ~500 | C | A | Inventive |
| 12 | Polyurethane | 8% PEGDME Mn ~500 | C | A | Inventive |
| 13 | Polyurethane | 4% PEGDME Mn ~1000 | C | A | Inventive |
| 14 | Polyurethane | 4% PEGDME Mn ~2000 | C | A | Inventive |
| 15 | Polyurethane | PEG diglycidyl ether | * | * | Comparative |
| 16 | Polyurethane | PEG dimethyl acrylate | D | A | Comparative |
| 17 | Polyurethane | PEG Monomethylether Mn ~350 | D | A | Comparative |
| 18 | Polyurethane | PEG Monomethylether Mn ~550 | D | A | Comparative |
| 19 | Polyurethane | None | D | A | Comparative |

Ratings:

A = 0 to 2 scratch marks,

B = 3 to 12 scratch marks,

C = 13 to 22 scratch marks,

D = more than 22 scratch marks,

* indicates head clogs.

As is readily apparent, only the inks and ink-sets having both the anti-abrasion polymer and the anti-abrasion aid gave adequate scratch resistance on freshly printed samples and excellent scratch resistance on kept print samples prepared from these inks. It is also apparent that the quantity of the anti-abrasion aid is best controlled for optimal performance.

Example 2

Additional Inks Were Prepared According to the Following Formulas

Magenta Ink 101 was prepared the same as Magenta Ink 19 except that the KOMT dispersed PR122 pigment was replaced by polymeric dispersed PR122 pigment (employing a copolymer dispersant comprised of benzylmethacrylate, stearyl methacrylate, and methacrylic acid, having a weight percent monomer ratio of 37/30/33, similarly as described in US Publication Numbers 2006/0012654 and 2007/0043144) and the Surfynol-465 was replaced by 0.5% Strodex PK-90.

Magenta Ink 102 was prepared the same as Magenta Ink 101 except that the ethylene glycol was replaced by 4% polypropylene glycol (PPG) 425.

Magenta Ink 103 was prepared the same as Magenta Ink 101 except that the ethylene glycol was replaced by 4% polyethylene glycol dimethyl ether Mn ~250 oligimer.

Magenta Ink 104 was prepared the same as Magenta Ink 101 except that the ethylene glycol was replaced by 4% polyethylene glycol dimethyl ether Mn ~500 oligimer.

Ink-sets #101 through 104 were assembled from Cyan Ink 1, Yellow Ink 1, Black Ink 1, and Magenta Inks 101 through 104, respectively. These four ink-sets were sequentially loaded into a Canon i960 thermal ink-jet printer and used to print multiple samples of a 64-patch color test chart designed to span the gamut of colors available from the individual ink-sets on Kodak Premium Picture Glossy Paper. One set of printed images were abraded using a 150 gram blunt point at 10 minutes after printing and another set of printed images were abraded using the same 150 gram blunt point at 24 hours after printing. The number of scratch marks visible on the charts after 10 minutes keep (fresh scratch) and 24 hours keep (aged scratch) were counted and the samples graded A (excellent), B (very good), C (adequate), or D (unacceptable) based on the number of scratch marks observed. Results are reported in Table II below.

TABLE II

| Ink-Set # | Polymer | Anti-Abrasion Aid | 10 minute scratch | 24 hour scratch | |
|---|---|---|---|---|---|
| 101 | Polyurethane | None | B | B | Comparative |
| 102 | Polyurethane | 4% Polypropylene Glycol 425 | B | B | Comparative |
| 103 | Polyurethane | 4% PEGDME Mn ~250 | A | A | Inventive |
| 104 | Polyurethane | 4% PEGDME Mn ~500 | A | A | Inventive |

As is readily apparent, replacement of the surfactant dispersed pigment with a polymeric dispersed pigment enabled a marked improvement in fresh sample scratch resistance in the presence of the preferred anti-abrasion polymer. However, only the images prepared from the ink-set having both the anti-abrasion polymer and anti-abrasion aid enabled excellent fresh and kept sample scratch resistance.

The invention has been described in detail with particular reference to certain preferred embodiments thereof, but it will be understood that variations and modifications can be effected within the spirit and scope of the invention.

The invention claimed is:

1. An aqueous inkjet ink comprising water, a charge stabilized anti-abrasion polymer provided as a hydrophobic colloidal sol, a water-soluble humectant, and a polyethyleneglycol-diether compound of Formula I as an anti-abrasion aid:

$$R_1-(OCH_2CH_2)_nO-R_2 \quad (I)$$

where $R_1$ and $R_2$ can be the same or different and are individually alkyl with 1 to 4 carbons, or phenyl, and n is between 2 and 45.

2. The ink of claim 1 wherein said anti-abrasion aid is a polyethylene glycol dimethyl ether having Mn between 160 and 2000.

3. The ink of claim 1 further comprising a colorant.

4. The ink of claim 3 wherein said colorant comprises a polymeric dispersed pigment colorant, a self-dispersed pigment, or a surfactant dispersed pigment.

5. The ink of claim 4 wherein said colorant comprises a pigment colorant dispersed with a polymeric dispersant formed from hydrophobic and hydrophilic monomers, wherein said hydrophobic monomers comprise benzyl methacrylate or acrylate, or methacrylic or acrylic acid esters containing an aliphatic chain having twelve or more carbons, and said hydrophilic monomers comprise carboxylated monomers.

6. The ink of claim 1 wherein said anti-abrasion polymer has a weight average molecular weight between 6,000 and 60,000.

7. The ink of claim 1 wherein said anti-abrasion polymer has a charge number between 30 and 180.

8. The ink of claim 1 wherein said anti-abrasion polymer is present at between 0.05 and 5 percent by weight.

9. The ink of claim 1 wherein said anti-abrasion polymer has a Tg of between 20 and 180° C.

10. The ink of claim 1 wherein said anti-abrasion polymer is a polyurethane.

11. The ink according to claim 10 wherein said polyurethane has an acid number between 60 and 100 and a weight average molecular weight greater than 10,000 and said ink has a pH between 7 and 10.

12. The ink of claim 11, further comprising a pigment colorant.

13. The ink of claim 12 wherein said colorant comprises a polymeric dispersed pigment colorant.

14. The ink of claim 1 wherein said anti-abrasion aid is present at between 0.1 and 8 percent by weight.

15. The ink of claim 1 wherein said anti-abrasion aid has a number average molecular weight between 100 and 2500.

16. The ink of claim 1 comprising one or more humectants present at between 3 and 45 percent by total weight.

17. An aqueous inkjet ink-set comprising at least two distinctly formulated inks, wherein at least one of said inks comprises a charge stabilized anti-abrasion polymer provided as a hydrophobic colloidal sol; at least one of said inks comprises a polyethyleneglycol-diether compound of formula I as an anti-abrasion aid:

$$R_1-(OCH_2CH_2)_nO-R_2 \quad (I)$$

where $R_1$ and $R_2$ can be the same or different and are individually alkyl with 1 to 4 carbons, or phenyl, and n is between 2 and 45; and at least one of said inks comprises a pigment colorant.

18. An aqueous inkjet ink-set according to claim 17, wherein at least one of said inks comprises a colored pigmented inkjet ink and at least one of said inks comprises an uncolored protective inkjet ink.

19. An image forming method comprising the step of imagewise applying one or more aqueous inks by jetting to a receiver, wherein said one or more inks cumulatively comprise water, a humectant, a charge stabilized anti-abrasion polymer provided as a hydrophobic colloidal sol, and a polyethyleneglycol-diether compound of formula I as an anti-abrasion aid:

$$R_1\text{—}(OCH_2CH_2)_n O\text{—}R_2 \qquad (I)$$

where $R_1$ and $R_2$ can be the same or different and are individually alkyl with 1 to 4 carbons, or phenyl, and n is between 2 and 45; wherein said one or more inks are applied so as to mix at a common loci of said receiver.

20. The method of claim 19 wherein at least one of said inks further comprises a colorant.

* * * * *